Jan. 21, 1964   H. D. WALTHER   3,118,175
RUBBER MIXER AND SEAL IN COMBINATION THEREWITH
Filed Nov. 30, 1961   2 Sheets-Sheet 1

INVENTOR
HARRY D. WALTHER
BY
Charles L. Lorensheck
attorney

Jan. 21, 1964 H. D. WALTHER 3,118,175
RUBBER MIXER AND SEAL IN COMBINATION THEREWITH
Filed Nov. 30, 1961 2 Sheets-Sheet 2

INVENTOR
HARRY D. WALTHER
BY
Charles L. Lovercheck
Attorney

United States Patent Office 3,118,175
Patented Jan. 21, 1964

3,118,175
RUBBER MIXER AND SEAL IN COMBINATION
THEREWITH
Harry D. Walther, Waterford, Pa., assignor to Skinner Engine Company, Erie, Pa., a corporation of Pennsylvania
Filed Nov. 30, 1961, Ser. No. 156,024
1 Claim. (Cl. 18—2)

This invention relates to rubber mixers and, more particularly, to a rubber mixer of the Banbury type, and is particularly concerned with the provision of an improved dust guard to exclude abrasive dusts and mastic compounds from entering the bearings of the mixer.

Since the actual mixing in the chamber is performed under considerable pressure through an air activated floating weight in the charging stack, dusts and mastic compounds leak through the chamber sealing rings and are forced along the journals into the bearings. Although sufficient lubrication pressure can be provided to continually expel grease from the bearings, it is not sufficient to stop these materials from entering the bearings.

Various grease retainers have been employed, but unsuccessfully, as they are not designed to stop these materials under pressure. These abrasive materials forced into and mixed with lubricant in the bearings accelerate wear abnormally and out of proportion to the overall life expectancy of the mixing chamber or body. This excessive bearing wear further contributes to a rapidly diminishing efficiency of the mixing chamber sealing rings as a result of the rapid drop of mixing rotor center distances.

The invention comprises an end frame having a counterbore or receptacle therein in which the bearing guard is located and in which it revolves. The bearing guard and the counterbore depend up each other for successful operation.

The receptacle or counterbore in which the bearing guard must revolve is made by counterboring the walls of the bushing socket of the end frames of the rubber mixer to a depth of approximately one-quarter of an inch with the bearing shortened a like amount so that the end of the bearing is flush with the bottom of this counterbore. The collar is made in two pieces, the flange being clamped securely to the journal at a point which permits the flange to revolve with the rotor within the counterbore. It is further designed and positioned so that the face of the flange is flush with the outer extremities of the bushing socket and the back, providing the necessary running clearance for thrust and the area acting additionally as a lubrication reservoir. The periphery of the flange provides sufficient running clearance to the wall of the counterbore for constant expulsion of lubricant.

The action of the bearing guard is to stop and intercept these abrasive compounds which might otherwise enter at this point and divert them to the periphery of the flange. This is done by the aid of the lubricant expulsion. Thus, the undesirable abrasive materials are slung by centrifugal force to the receptacles provided. With the lubricant expulsion point removed to the periphery of the flange and away from the actual bearing entrance, dust and abrasive compounds cannot accumulate for forced entry into the bearings.

As a result of the lubrication reservoir behind the flange, an additional safety factor is provided. At times of lubrication failure or overheating of bearings, when the mixer is continued in operation, the lubricant can flow back into the bearing area and lubricant will be provided.

It is, accordingly, an object of this invention to provide an improved dust seal for the end of the main shaft of a Banbury mixer.

Another object of the invention is to provide an improved bearing in combination with a Banbury mixer.

A further object of the invention is to provide an improved rubber mixer.

A still further object of the invention is to provide a mixer which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claim, it being undestood that changes may be made in the form, size, proportions, and minor details of construction without departing from the spirit or sacrificing any of the advantages of the invention.

Figure 1:
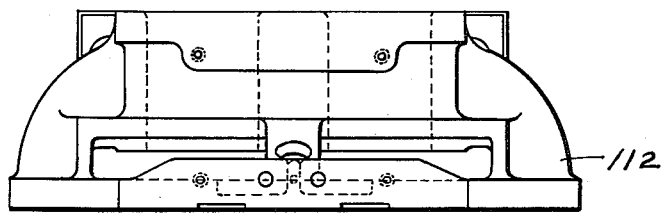
FIG. 1 is a side view of the end frame of a mixer according to the invention.
Figure 2:
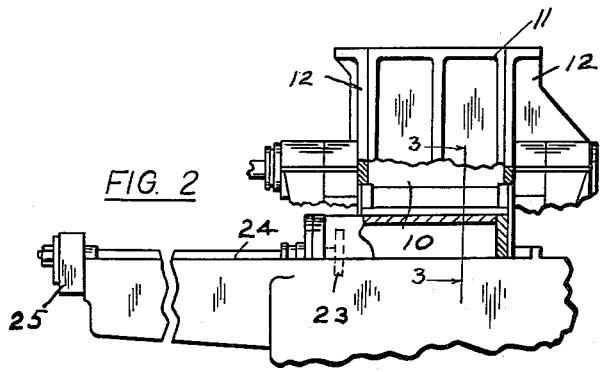
FIG. 2 is a side view of a Banbury type mixer.
Figure 3:
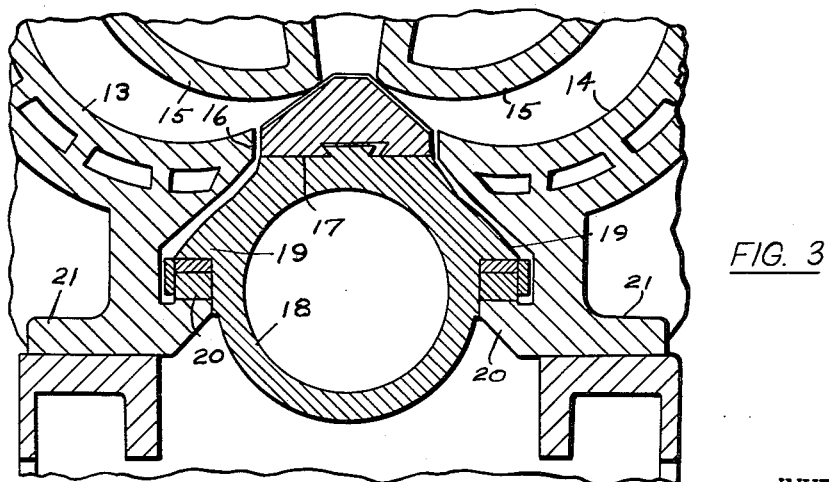
FIG. 3 is a cross sectional view taken on line 3—3 of FIG. 2.
Figure 4:
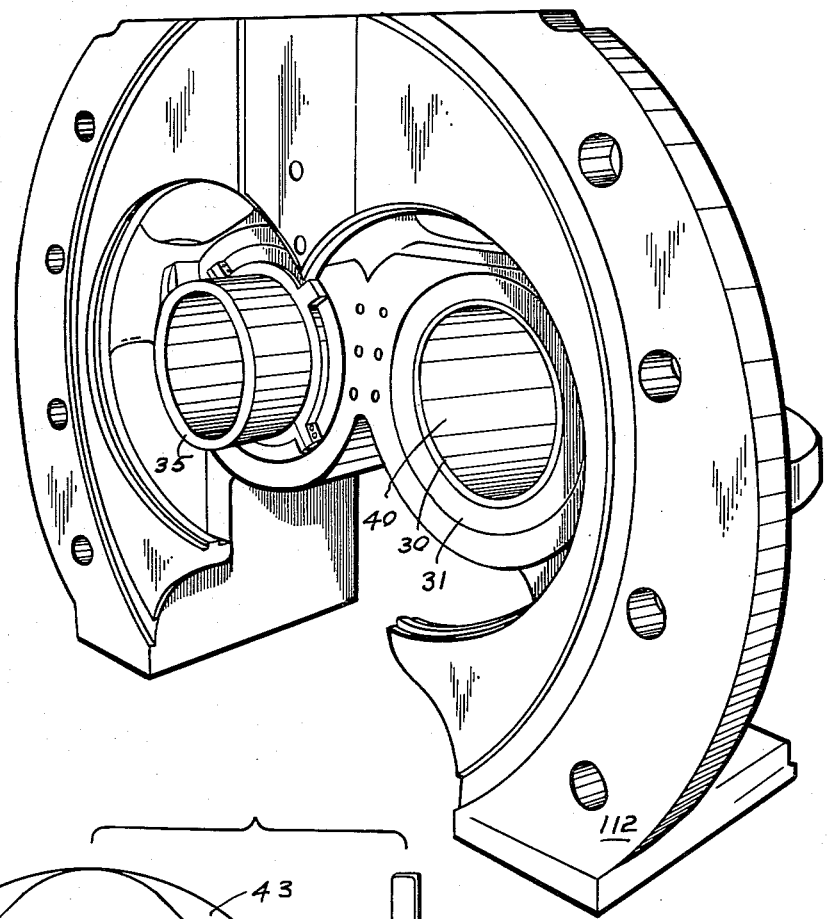
FIG. 4 is an isometric view of the inside of the end frame.
Figure 5:
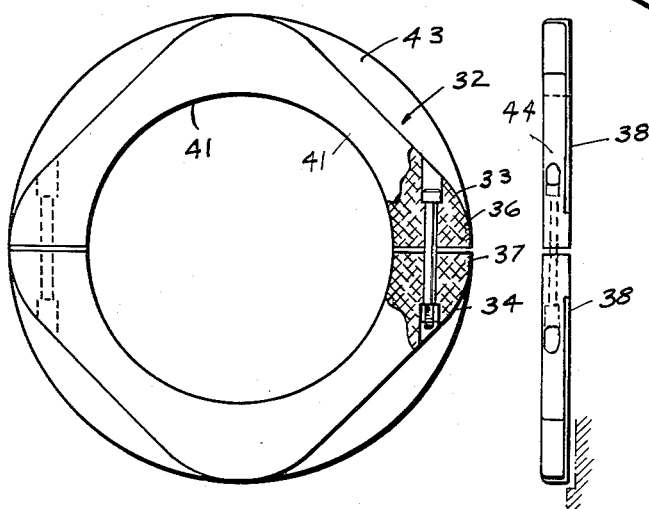
FIG. 5 shows both a side view and an end view of the improved bearing guard.

Now with more particular reference to the drawings, a chamber 10 is shown having a charging stack 11 at the upper portion thereof. The charging stack 11 is provided with end walls 12 which are continued downward to form the end walls or end plates for the chamber 10. Instead of the end walls 12, an end frame 112 shown in FIG. 1 may be substituted on the machine.

As shown, the chamber 10 is of the double cylinder type consisting of two cylinders 13 and 14 in each of which is mounted a bladed rotor 15. As will be seen from a study of the drawings, the two cylinders communicate with each other at their adjacent portions so as to form a chamber of substantially a double cylindrical shape.

At the lower portion of the chamber and at the central portion thereof, there is provided a discharge opening 16. The opening is closed by a door or closure member 17 which is, in this instance, slidably mounted to be moved to open and closed position. The door 17 is keyed or otherwise secured to a cylinder 18. The cylinder 18 is provided with wings 19 adapted to extend laterally over ways 20 provided on a lower base portion 21 of the chamber 10. The door is adapted to be moved to open and closed position by means of fluid pressure introduced into one or the other of the opposite ends of the cylinder. The fluid pressure works against a piston 23 mounted on a piston rod 24, the outer end of which is rigidly held at 25 in a base portion 26 of the mixer. As the piston is thus fixed against longitudinal movement, it will be understood that introduction of fluid pressure upon one side or the other of the piston 23 will affect movement of the cylinder 18 and the door 17 in opposite directions to either an open or a closed position.

The end frame 112 has bores 30 therein which are counterbored at 31 to a depth of approximately one-quarter inch. A two piece collar 32 made up of pieces 33 and 34 is inserted in the counterbore and clamped securely to the journal indicated at 35 by means of studs 36. The studs 36 have heads disposed in counterbores in one-half of the collar 32 and threadably engage holes in the other side at 37. The necessary running clearance is provided between an outer face 38 of the collar 32 and the end frame 112. The collar has a radially extending flange 43 which has the outer face 38 which is a flat side which runs in proximity to the bottom of the counterbore and an axially extending flange 44. When the mixer is assembled, the chamber between the flat side 38 and the bottom of the counterbore 31 provides an additional lubricant reservoir and also prevents any dust or abrasive materials from the inside of the mixer from entering the space between the journal 35 and a bearing surface 40.

An inside periphery 41 of the collar is slightly smaller in radius than the outer periphery of the journal 35 so that the studs 36 are tightened, the collar will be tightly clamped on the journal, and dust cannot flow between the collar and the journal. Since the space in the counterbore behind the flat side 38 is filled with grease, it will protect the journal from dust.

The foregoing specification sets forth the invention in its preferred practical forms but it will be understood that the structure shown is capable of modification within a range of equivalents without departing from the invention which is to be understood is broadly novel as is commensurate with the appended claim.

The embodiments of the invention in which an exclusive property or privilege is claimed are defined as follows:

A mixer for heavy plastic materials comprising a chamber in the form of a double cylinder having a bladed rotor in each of the cylinders thereof, said chamber being provided with a discharge opening, said rotors each terminating at one end in a journal, bearings defining openings in one end of said mixer for rotatably receiving said journals, a counterbore in said end of said mixer around each said opening, and an annular flanged member clamped to said journals with the flange thereof extending radially outwardly from one end of said annular flanged member and disposed in said counterbore, said flange being adapted to be in engagement with rubber in said mixer, said flange forming a closure of said counterbore for lubricant between said flanged member and said end of said mixer.

References Cited in the file of this patent

UNITED STATES PATENTS

| | | |
|---|---|---|
| 1,371,046 | Mosher | Mar. 8, 1921 |
| 1,836,355 | Banbury | Dec. 15, 1931 |
| 1,987,659 | Banbury | Jan. 15, 1935 |
| 1,989,619 | Ledeen | Jan. 29, 1935 |
| 2,754,161 | Bouvat-Martin | July 10, 1957 |